Patented Apr. 16, 1940

2,197,574

UNITED STATES PATENT OFFICE 2,197,574

VULCANIZATION OF RUBBER

George W. Watt, Akron, Ohio, assignor to Wingfoot Corporation, Wilmington, Del., a corporation of Delaware No Drawing. Application September 23, 1937, Serial No. 165,381

12 Claims. (Cl. 260—784)

This invention relates to the vulcanization of rubber. More particularly, it relates to the vulcanization of rubber utilizing as accelerators thereof a class of compounds not heretofore employed for this purpose. It includes the method of vulcanization and the rubber products obtained thereby.

According to the invention, it has been discovered that a class of compounds derived from the interaction of dithiocarboxylic acids and N-halo imides of dicarboxylic acids make possible the vulcanization of rubber in very short times while obtaining cured rubber products of outstanding physical properties. The compounds may be obtained by reacting an N-halo imide of a dicarboxylic acid with any dithiocarboxylic acid, preferably in the form of its alkali metal or ammonium salt.

The following example demonstrates the method and ease of preparation of the materials.

Example 1

Fifty-five parts of sodium penta methylene dithiocarbamate were dissolved in 500 parts of alcohol. To this solution 40 parts of N-chloro succinimide were added in small portions and with agitation. The mixture was cooled in an ice bath to avoid excessive temperatures produced by the considerable amounts of heat evolved in the reaction. The reaction mixture was finally warmed on a steam bath for one hour. The precipitated sodium chloride formed in the reaction was then filtered off and the clear filtrate was cooled in an ice bath. From the alcoholic filtrate there separated in successive crops 48 parts of pale yellowish-white crystals which melted at 120–123° C. The recovered product represented a yield of 62% of the theoretical, but, judging by the 15 parts of sodium chloride recovered out of the 17 parts theoretically possible, the reaction proceeded to about 88% completion.

Materials of this type are possessed of limited stability so that they do not lend themselves readily to the ordinary methods of purification and identification. However, it is reasonably certain that the principal product formed may be represented by the formula:

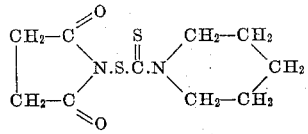

Any other N-halo imide of a dicarboxylic acid may be employed in place of the N-chloro succinimide of the example. However, the available materials of this type are somewhat limited in number and of those available some do not readily lend themselves to the preparation of derivatives because of the instability of the compounds formed. From the practical standpoint, therefore, the imides useful in the invention will be more or less limited to the cyclic type of imide as represented by succinimide. Of these materials the aliphatic imides constitute the preferred group. Various substituted N-halo succinimides are equally as reactive and useful as the N-chloro succinimide of the example and constitute a particularly preferred class. Other examples are the N-halo derivatives of ethyl succinimide, phenyl succinimide, methyl succinimide, symmetrical dimethyl succinimide, unsymmetrical dimethyl succinimide, pyrotartrimide, etc. Other materials included within the scope of the invention are the N-halo imides of maleic acid, citraconic acid, and derivatives containing various substituent groups such as alkyl, aryl, aralkyl, alkoxy, amino, halogen, etc. Also included are the N-halo imides of aromatic discarboxylic acids, of which phthalic acid is the leading example. From the standpoint of stability and other considerations, the N-halo imides of succinic and maleic acids and of the various substituted succinic and maleic acids constitute a particularly preferred class.

Any dithiocarboxylic acid, preferably in the form of an alkali metal or other water-soluble salt, such as the sodium, potassium and ammonium salts, may be employed. Included among these are the dithiocarbamic acids, such as N-butyl dithiocarbamic acid, benzyl dithiocarbamic acid, beta phenethyl dithiocarbamic acid, phenyl dithiocarbamic acid, ethyl dithiocarbamic acid, cyclohexyl dithiocarbamic acid, para tolyl dithiocarbamic acid, alpha furfuryl dithiocarbamic acid, para ethoxy cyclohexyl dithiocarbamic acid, allyl dithiocarbamic acid, methyl ethyl dithiocarbamic acid, di isopropyl dithiocarbamic acid, dihexyl dithiocarbamic acid, dicyclohexyl dithiocarbamic acid, tetrahydro alpha furfuryl cyclohexyl dithiocarbamic acid, methyl phenyl dithiocarbamic acid, etc. Also included are the xanthogenic acids, such as methyl xanthogenic acid, ethyl xanthogenic acid, amyl xanthogenic acid, etc. Other representative dithiocarboxylic acids are dithiofuroic, dithiobenzoic, dithioacetic, dithiolauric, dithio-oleic, dithioacrylic, dithiocrotonic, phenyl dithioacetic, ortho amino dithiobenzoic, dithiosalicyclic, etc. The dithiocarbamic acids derived from secondary amines constitute a particularly preferred class.

Any of the foregoing imides and acids or others of the same classes may be employed to form materials coming within the scope of the invention and useful in its practice. The reaction is preferably carried out at room temperature or below because of its exothermic character. However, it will proceed at higher temperatures being limited only by the decomposition temperatures of the materials involved.

The products may be used to advantage in almost any of the usual rubber compounding formulae. The following is one in which they have been found to yield excellent results.

|  | Parts by weight |
|---|---|
| Smoked sheet rubber | 100 |
| Zinc oxide | 5 |
| Sulfur | 3 |
| Accelerator | 0.5 |

When the material prepared according to Example 1 was incorporated in the rubber in accordance with the above formula and samples were cured and tested, the following data were obtained:

| Cure mins. at °F. | Tensile break, kgs./cm.² | Ult. elg., percent | Modulus in kgs./cm.² | |
|---|---|---|---|---|
|  |  |  | 500% | 700% |
| 30/240 | 150 | 780 | 24 | 91 |

Other materials coming within the invention are likewise efficient accelerators, yielding products possessing excellent tensile and modulus characteristics.

While only the preferred forms of the invention have been described in detail, it will be apparent to those skilled in the art that various modifications may be made therein without departing from the spirit of the invention or the scope of the appended claims in which it is intended to cover by suitable expression all patentable novelty residing in the invention.

What I claim is:

1. The method of treating rubber which comprises vulcanizing the same in the presence of the reaction product of an N-halo imide of a dicarboxylic acid with a dithiocarboxylic acid.

2. The method of treating rubber which comprises vulcanizing the same in the presence of a material obtainable by reacting an N-halo succinimide with a dithiocarboxylic acid.

3. The method of treating rubber which comprises vulcanizing the same in the presence of a material obtainable by reacting an N-halo succinimide with a dithiocarbamic acid.

4. The method of treating rubber which comprises vulcanizing the same in the presence of a material obtainable by reacting N-chloro-succinimide with a dithiocarbamic acid derived from a secondary amine.

5. The method of treating rubber which comprises vulcanizing the same in the presence of a material obtainable by reacting an N-halo-imide of an aliphatic dicarboxylic acid with a dithiocarboxylic acid.

6. The method of treating rubber which comprises vulcanizing the same in the presence of N-(pentamethylene dithiocarbamyl) succinimide.

7. A rubber product which has been vulcanized in the presence of the reaction product of an N-halo-imide of a dicarboxylic acid with a dithiocarboxylic acid.

8. A rubber product which has been vulcanized in the presence of a material obtainable by reacting an N-halo succinimide with a dithiocarboxylic acid.

9. A rubber product which has been vulcanized in the presence of a material obtainable by reacting with an N-halo succinimide a dithiocarbamic acid.

10. A rubber product which has been vulcanized in the presence of a material obtainable by reacting N-chloro-succinimide with a dithiocarbamic acid derived from a secondary amine.

11. A rubber product which has been vulcanized in the presence of a material obtainable by reacting an N-halo-imide of an aliphatic dicarboxylic acid with a dithiocarboxylic acid.

12. A rubber product which has been vulcanized in the presence of N-(pentamethylene dithiocarbamyl) succinimide.

GEORGE W. WATT.